United States Patent [19]
Dreves

[11] Patent Number: 4,457,048
[45] Date of Patent: Jul. 3, 1984

[54] APPARATUS FOR A SLAUGHTERHOUSE, MORE SPECIALLY FOR THE REMOVAL OF THE TOE-WEB OF PIGS

[75] Inventor: Adrianus Dreves, Wehl, Netherlands

[73] Assignee: North West Engineering B.V., Netherlands

[21] Appl. No.: 312,732

[22] Filed: Oct. 19, 1981

[30] Foreign Application Priority Data

Oct. 21, 1980 [NL] Netherlands .................... 8005798

[51] Int. Cl.³ ............................................. A22B 5/20
[52] U.S. Cl. ............................................ 17/1 R; 17/24
[58] Field of Search ........................... 17/1 R, 24, 52

[56] References Cited
U.S. PATENT DOCUMENTS 3,548,448 12/1970 Vertegaal ..................... 17/24 X
4,297,764 11/1981 Tournier ..................... 17/1 R X FOREIGN PATENT DOCUMENTS
6501627 2/1964 Netherlands .

Primary Examiner—Willie G. Abercrombie
Attorney, Agent, or Firm—Allegretti, Newitt, Witcoff & McAndrews

[57] ABSTRACT

An apparatus for use in pig-slaughterhouses for the removal of the toe-web between the toes of the hindlegs of a slaughtered pig. The bodies of slaughtered pigs, vertically hung on carrying-yokes, are carried by a conveyer. The bodies are oriented by a spring-loaded yoke so that they will pass through a removing-station with the hindlegs perpendicular to the direction of transportation. A double swing is placed on each side of a rotating milling-cutter (of the metal-milling type). The swing allows the milling-cutter to rotate in a plane parallel to the direction of transportation. The milling-cutter also positions itself with an elongate guide into the right position for each subsequently arriving and passing pair of hind-legs.

7 Claims, 6 Drawing Figures

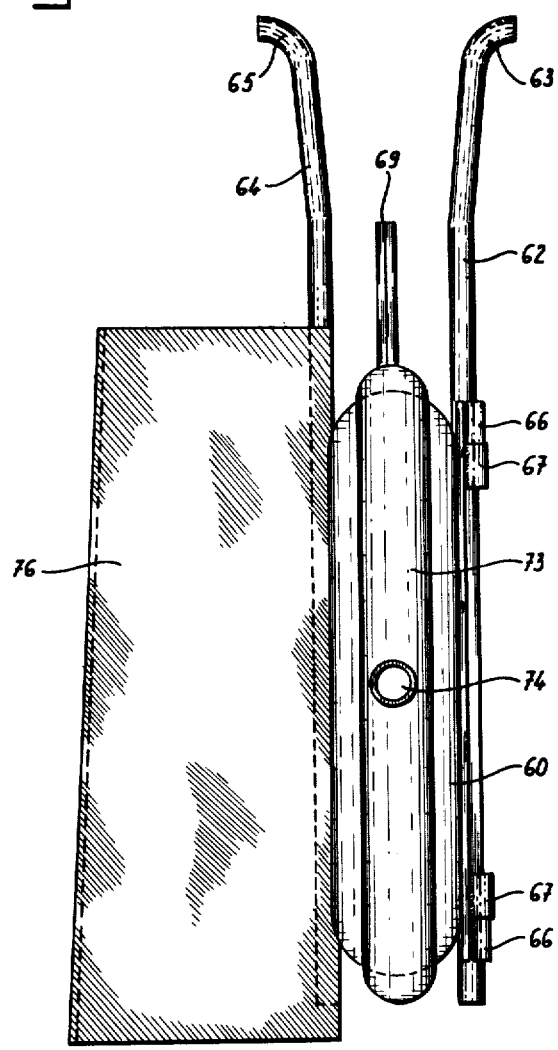

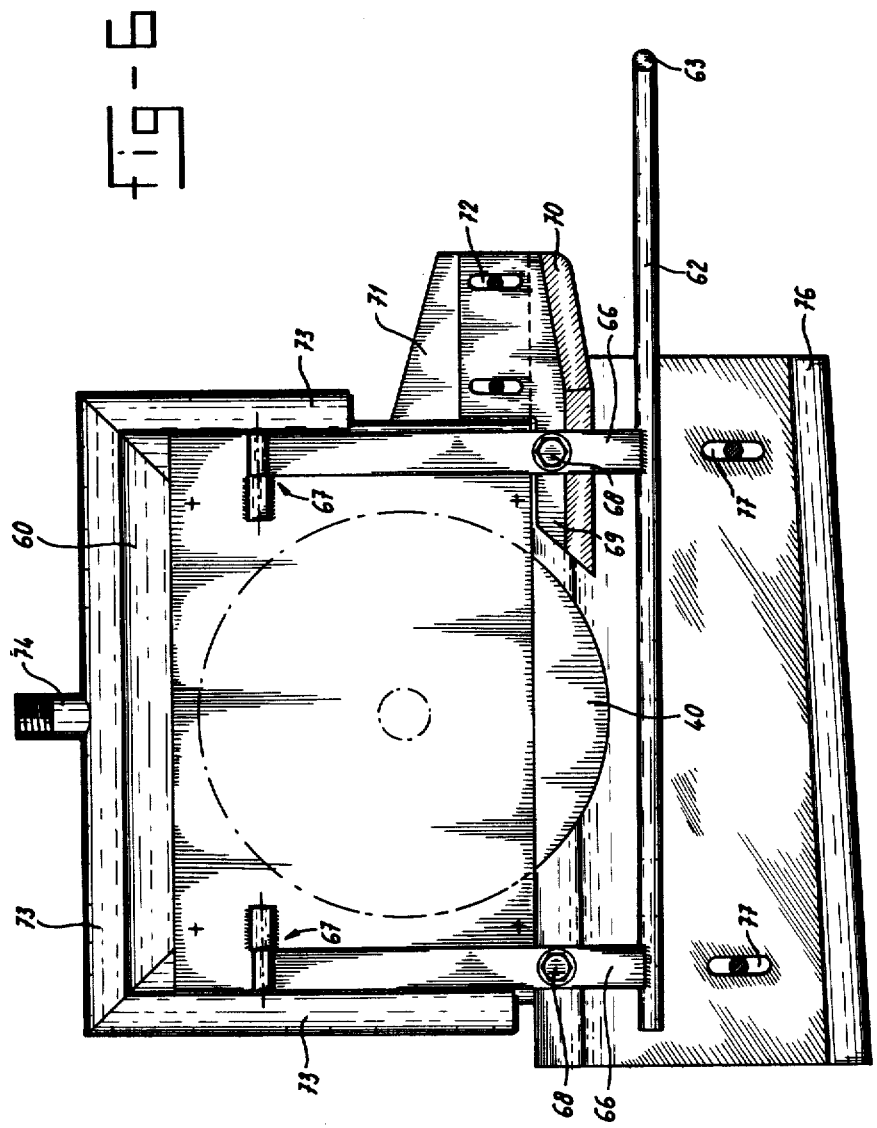

APPARATUS FOR A SLAUGHTERHOUSE, MORE SPECIALLY FOR THE REMOVAL OF THE TOE-WEB OF PIGS

The present invention relates to an apparatus for the removal of a toe-web or toe-membrane. In particular, of the hindlegs of pigs where the slaughtered pigs have been hung by the tendons of each hindleg on a coat-hook-shaped carrying-yoke in a slaughterhouse. The carrying-yoke is hung from a horizontal conveyor and may be pivoted, about a vertical axis. The yoke is uniformly moved forward, passing along a toe-web cutting station.

In existing slaughterhouses, the pigs, hanging on their hindlegs, are transported over a conveyor through a sequence of different stations for the cleaning of the exterior and for the removal of the hair or brushes. It has been found, however, that the toe-web or toe-membrane between both toes of the hindlegs is not sufficiently cleaned and may therefore form a source of bacteria. This may lead to final rejection of the meat. According to the existing art the toe-web is removed by hand, e.g. with a knife. This is not only expensive, but also dependent on the attention and the skill of the man involved. In the chain of preceding and following handlings, which are all highly mechanized, the removal of the toe-web forms a missing link in the mechanized process. Attempts have been made to clean the space between the toes and to remove the toe-web as far as possible by means of rotating brushes. The brushes became clogged within short, however, making continuous working impossible. Also, the quality of the work proves not to be reproducible as well. The body hanging on its carrying-yoke was rotated in such position, that the line connecting both hindlegs was parallel to the direction of transportation by the conveyor. Thus the legs passed one after the other along the brushes, which were helicoil shaped with the center line of rotation extending parallel to the direction of transportation.

The invention aims for an adequate machine for the removal of the toe-web in a reproducible manner.

The apparatus as described above is characterized according to the invention as follows: The toe-web for each hindleg of a pig is removed by applying the cutting profile of a rotatable driven-milling-cutter. The carrying structure of the conveyor is fitted with an orientation means. Over over a limited trajectory of the conveyor path in the area of the toe-web cutting station, the orientation means orients the vertically hanging body of the pig on its carrying-yoke with respect to the direction of transportation by pivoting it about the vertical rotation axis of the yoke. The line connecting both hindlegs of the pig is consequently perpendicularly to the conveyor path and is maintained in this position during the cutting and handling. Each cutting wheel is rotatingly supported on a supporting means, while the axis of rotation of the cutting wheel is continuously maintained in a vertical plane perpendicular to the conveyor path. The supporting means is pivotable about at least one axis parallel to the direction of transportation. The supporting means is fitted with guiding means for the self-orientation of the cutting wheel in relation to the appropriate leg of the pig.

It has been proved by experiments that the toe-web could be removed in a very simple way by using a milling-cutter. The energy consumption should be minimized, which means that as little as possible material should be milled away between the toes. Therefore, the positioning of the milling-cutter with respect to the toes of each hindleg should take place accurately and in a reproducible way. Almost independently of the size of the pig, the mutual position of both legs is always dictated by the coat-hook-shaped carrying-yokes of the conveyor. The milling means of the present invention therefore makes use of this distance which, by good approximation, is constant. In order to avoid superfluous and vulnerable control systems for the further positioning functions of the cutter with respect to each following leg, the apparatus is designed such that all positioning movements are derived from the uniform movement of the conveyor, which is present anyhow. With a presently existing means, the coat-hook-shaped carrying-yoke is rotated such that the yoke takes a perpendicular position with respect to the direction of transportation. The existing means, however, is not able to position more accurately than plus or minus 10°. When approaching the station, the carrying-yoke therefore meets a more precisely working orientation means, which accurately positions the prepositioned carrying-yoke perpendicular to the direction of transportation and keeps it in this position. This is possible because the legs of the orientation-yoke force the carrying-yoke to rotate into a perpendicular position with respect to the direction of transportation. During the milling procedure, the orientation means forces the carrying yoke to move parallel to itself and at the same time tends to suppress a possible shaking effect of the transport-motion during the milling operation and the effects introduced by the milling itself.

With the help of the orientation means, both legs of each subsequent pig, by good approximation, follow the same course. Thus, the cutting miller only needs to be moved slightly in order to find its optimum position each time. Thanks to the bi-pivoting suspension about pivoting-center-lines parallel to the direction of transportation, the transport means itself performs the orientation and the advance during milling of the milling cutter as well. For that purpose, the supporting means of the cutter is provided with guiding means which control the alignment and positioning both in the horizontal plane as well as in the vertical direction with respect to both toes of each leg. During the forward movement each leg enters between said guiding means of the supporting means for the cutter. This is because the leg which is itself to be milled performs the alignment of the milling cutter in the horizontal and the vertical plane.

The necessary pressure acting on the cutter during the operation is at the one hand provided by the weight of the cutter with its drive on the supporting means. On the other hand, the necessary pressure is also provided by a double-acting spring loading arrangement which tries to keep the cutter in the vertical plane in a central mid-position.

According to a preferred embodiment of an apparatus according to the invention, the cutter is provided with profiled cutting of the type which are normally used for machining metals.

Other characteristics of the invention will become evident with the help of the following description of the figures of a preferred embodiment of an apparatus according to the invention.

FIG. 5 shows a top view of part of the milling means.

FIG. 6 shows a side view according to arrow 6 of FIG. 2, depicting the milling means.

Figure 1:
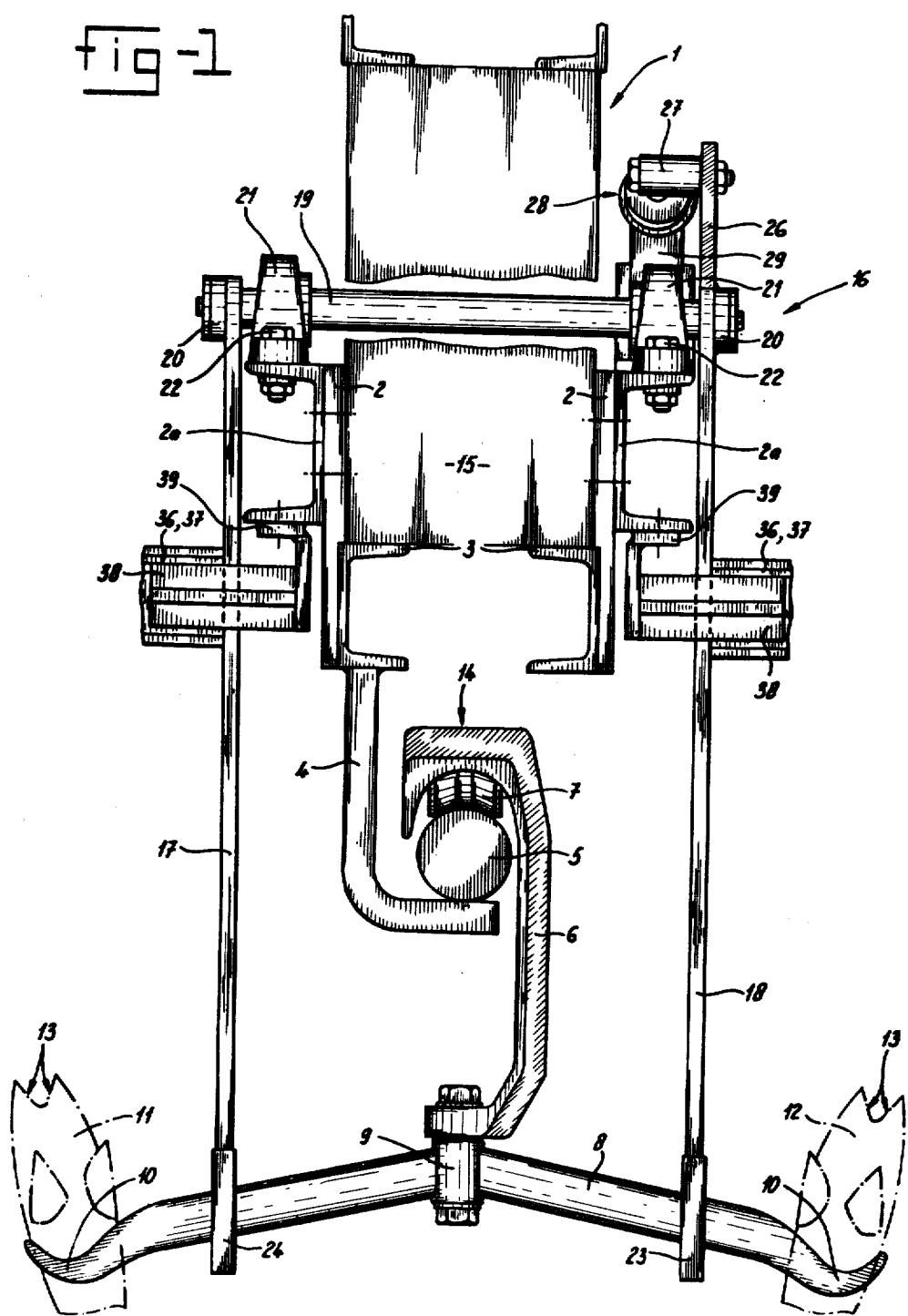
FIG. 1 shows a cross-section through the transportation-means, including a carrying-yoke and the orientation means in the area of the milling station.

With 1 in FIG. 1, a carrying structure for the transport chain is depicted schematically, which extends over a greater part of the slaughterhouse and is fitted several meters above the working floor. To this carrying structure 1, the transport rail 5 is fixed with the help of - schematically depicted - connecting plates 2 and profile-beams 3. The rail 5 itself, in the depicted example, consists of a stiff cylindrical rod and is supported at regular intervals by L-shaped straps 4. Over the transport rail 5, carrying-straps 6 are movably hung through pivotable profiled rollers 7. At the lower side of each carrying-strap 6, a coat-hook-shaped carrying-yoke 8 is fitted by means of a pivotable hinge 9; the yoke has symmetrically hook-shaped ends 10. Each hook-shaped end 10 is pierced through the tendons of the hindlegs 11 of a (not-illustrated) pig, enabling the body to be transportable in a vertically and symmetrically hung-down position straight under the transport path 5. Between the toes of each hindleg 11, 12, there is the toe-web or toe-membrane at 13, which has to be removed in the milling station by the apparatus according to the invention.

Between the profile-beams 3, a not-illustrated transport chain is movable, said chain being fitted with not-illustrated catches, which at 14 are arranged for carrying with them each individual carrying-strap 6 in a uniform forward movement with constant mutual spacing. It is pointed out that the carrying-straps 6 always take one fixed position with respect to the transport rail 5 and thus with respect to the direction of transportation. The carrying yoke 8, however, is freely rotatable about a vertical axis with the help of a bearing 9 fitted to the carrying-strap 6. Without outside influences, each subsequent body is therefore transported at uniform speed, downwardly hanging, in an arbitrary vertical position of rotation.

Figure 2:
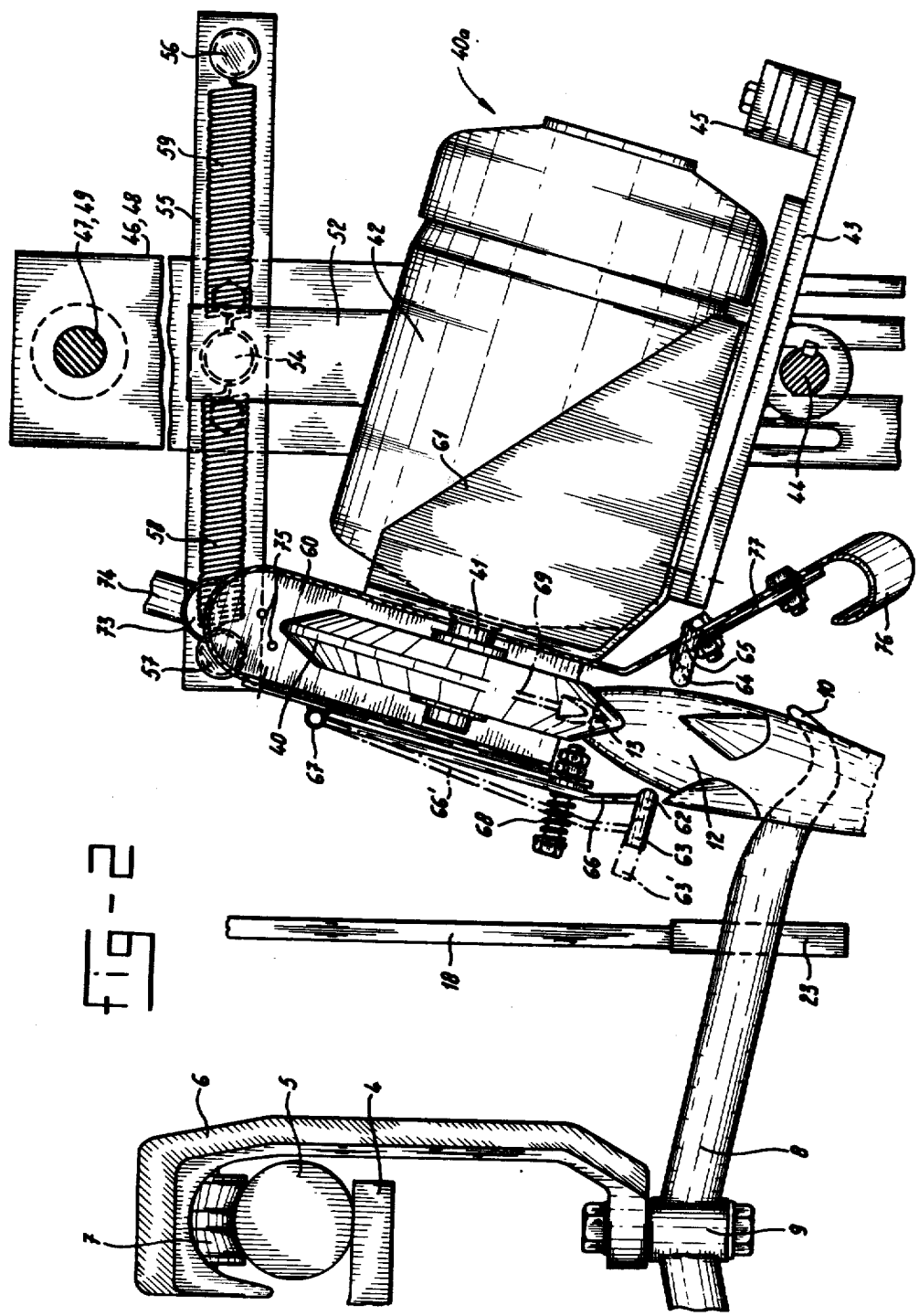
FIG. 2 shows a similar cross-section as FIG. 1, in which the milling means with its supporting means is depicted as placed aside of the transport rail and the orientation means.
Figure 3:
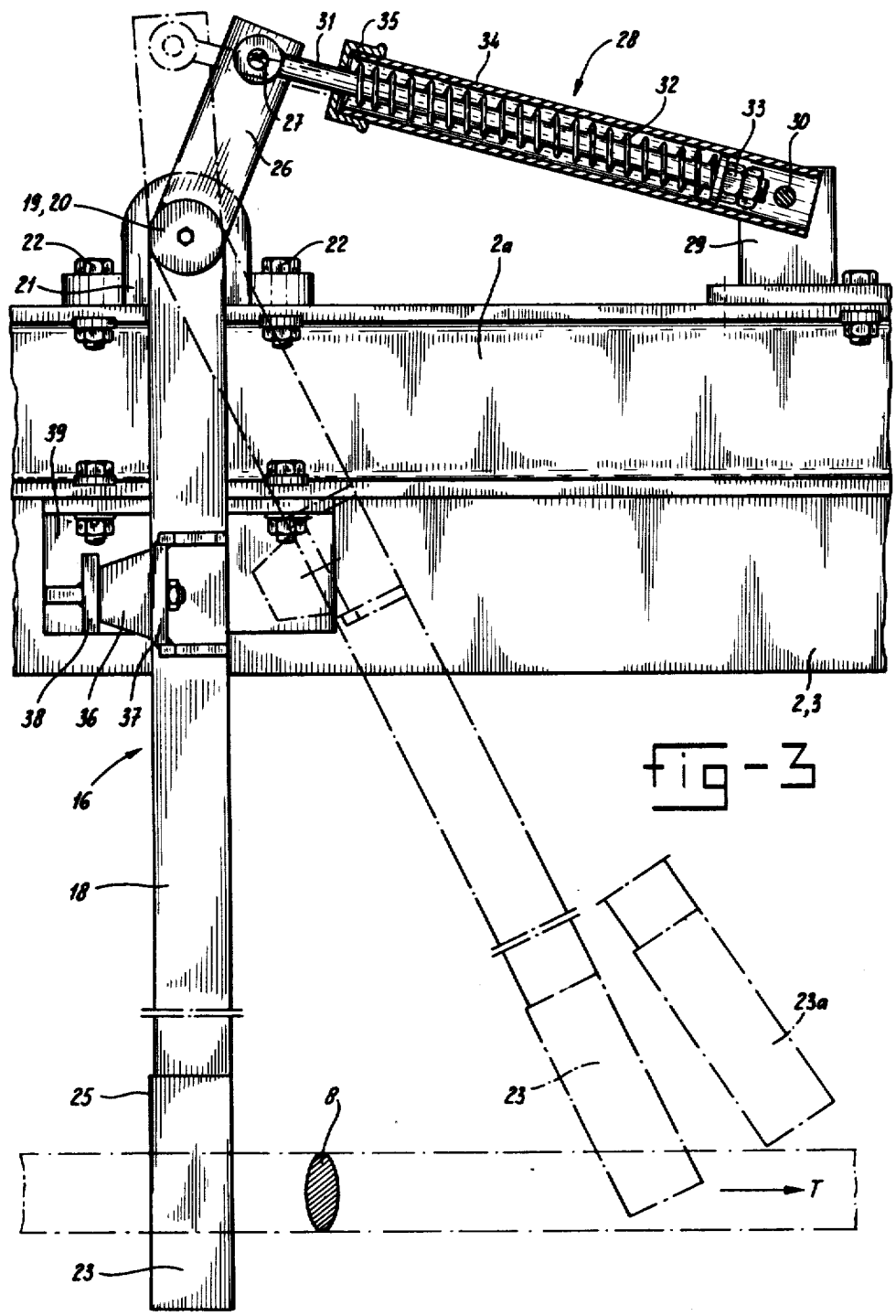
FIG. 3 shows a side view of the orientation means according to FIG. 1.

In FIGS. 1, 2 and 3, the orientation-means 16 is shown, which is adapted to have the body transported through the milling station always in one fixed position and which furthermore guarantees that any pulsating effect of the transportation during the milling operation will be dampened. A turned-over U-shaped orientation-yoke, consisting of two perpendicular downwardly extending legs 17 and 18, together with a pivoting shaft 19 supporting them in a torsion-resisting way. The turned-over U-shaped orientation yoke bears with both of its ends 23 and 24 on the arms of the coat-hook-shaped carrying-yoke 8 during transition of the carrying-yoke 8 over the trajectory through the milling station. With bearings 21 and bolts 22, the interconnecting shaft 19 is swingingly fitted to the profile-beams 2a, which form part of the carrying structure 1. The rotation shaft 19 extends perpendicular to the direction of transportation and extends in a horizontal plane. As FIG. 3 shows, one of the legs extends upwardly at 26 and is connected with its free end pivotingly about a shaft 30 to a console 29. The console 29 is fitted with bolts or so to a part 2a of the carrying structure 1. From the extended U-shaped leg 26 and the pivoting pin 27, a rod 31 extends through the dash-pot and carries at its other end a spring-retainer 33. The retainer 33 is adjustable with adjusting nuts fitted to the rod 31. The left-side end (according to FIG. 3) of the dash-pot is closed by a cover 35 with a central opening through which the rod 31 passes slidingly. Between the spring-retainer 33 and the cover 35 a pressure spring 32 is engaged concentrically about the shaft 31. The force of the spring working on the orientation-yoke urges the ends 23 or 24 of the yoke against the direction of transportation of the bodies. As FIG. 3 depicts, the orientation-yoke 17, 18 extends in its rest-position approximately vertically downward, in which position the spring force urges the legs against stops 38. The stops are fitted with pedestals 39 to parts of the carrying structure 2a. On the same height, stop-bearers 37 with resilient buffers 36 are fitted. The depicted position of rest limits at the same time the place of entrance into the milling trajectory. The legs 17 and 18 are broadened at their lower ends 23 and 24 and fitted with schematically depicted wear-resisting and elastic buffers 25. As soon as a carrying-yoke 8 approaches in service in the prepositioned position-of-rotation of plus or minus 10°, one of the arms will touch first one of the ends 23 or 24 of the orientation-yoke 16. The force exerted by the dash-pot 28 is sufficiently large so that the orientation-yoke will remain in its rest-position, urging the coat-hook-shaped carrying-yoke 8 to rotate about its axis 9 during further movement of the transport means. As soon as the other arm of yoke 8 touches the other end 23 or 24 of the orientation-yoke 16, the continuing transportation-movement will let the yoke 16 pivot about its shaft 19, compressing the spring 32. Since both the legs 17 and 18 of the orientation-yoke are rigidly coupled one to the other by means of the pivoting shaft 19, the orientation-yoke 16 forces each passing carrying-yoke 8 to be transported in one and the same position parallel to itself through the cutting station. In this position, the line connecting both hindlegs 11 and 12 continuously extends perpendicular to the direction of transportation. The orientation-yoke 16, with its pivoting shaft 19, is located in such a position and has such a length that a little past the cutting trajectory the lower ends have reached the position 23a (FIG. 3). In this position the carrying-yoke 8 is freed from the orientation-yoke 16. At this moment, the orientation-yoke stops influencing the carrying-yoke 8 and returns into its rest-position which is depicted with the drawn lines in FIG. 3 and are ready then again to orient the next following carrying-yoke 8. It may be noted that all forces necessary for the orientation-movement are derived from the motion of the transport means 14. In FIG. 3, the rail and the direction T of transportation of one arm of the carrying-yoke 8 is schematically depicted. Should it be of advantage to give the body another orientation after having left the cutting station, the positioning- or orientation-means 16 may be used for that purpose by letting one of the arms 23 or 24 extend somewhat lower than the other. Thus the longer arm rotates the carrying-yoke 8 about its pivoting shaft 9 before the carrying-yoke 8 will leave the longest of the arms 23 or 24.

Figure 4:
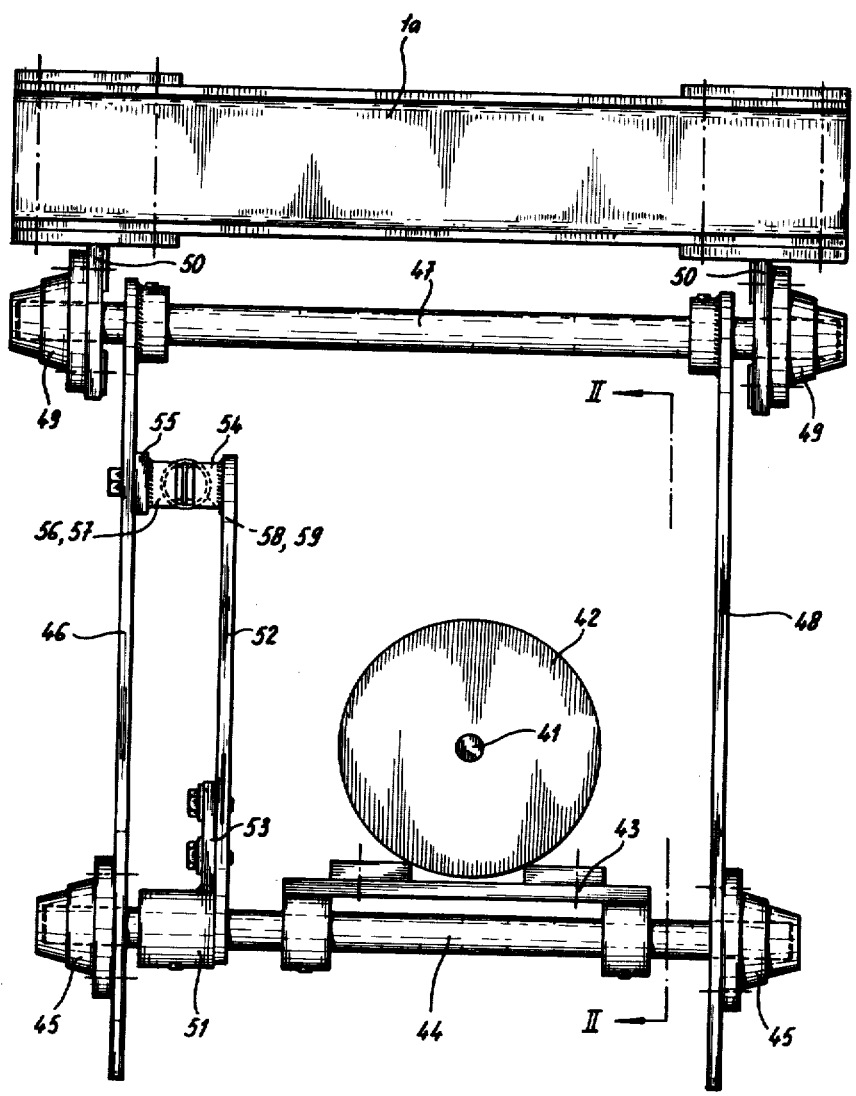
FIG. 4 shows a side view of the supporting means of the milling cutter according to FIG. 2.

In FIG. 2, left side, part of the transport-means is illustrated schematically as well as leg 18 of the orientation-yoke as described and illustrated in FIGS. 1 and 3. According to the righthand part of FIG. 2, the milling installation for one of the pig-legs 12 is illustrated. It will be evident that a similar means, installed in mirror-image, will be fitted at the lefthand side for leg 11. In FIG. 2, only one of these is depicted. FIG. 2 shows, according to arrow 4 from FIG. 4, a side view of the milling installation. The installation contains a profile-cutter 40 with an adapted profile to completely remove the toe-webs 13 between both toes of the leg 12. Leg 12, as described above, moves over a linear path, perpendicular to the plane of the drawing, towards the milling means. The milling cutter 40 is fitted to a shaft 41 of an electric motor 42 or so. The motor 42 is mounted in a known manner with its feet on the supporting means 43. The supporting means 43 rests on a pivoting shaft 44 which extends parallel to the direction of transportation. Because the center of gravity of the motor with its cutter may be situated above and at the left side of the pivoting shaft 44, there is the possibility of adjusting the required situation of instable equilibrium with balancing weights 45. The supporting means 43 is rigidly fitted to the pivoting shaft 44, which shaft is rotatably carried by the bearings 45. These bearings are fitted to the lower side of both arms 46 and 48 belonging to a swing-shaped support. At their upper ends, the arms 46 and 48 are rigidly fitted to an upper pivoting shaft 47, having the arms 46 and 48 forming, together with the upper pivoting shaft 47, a stiff fork. With its ends, the upper pivoting shaft 47 on its turn is rotatingly carried in bearings 49. The bearings 49 are fitted with schematically indicated brackets 50 to a part 1a belonging to the rigid carrying structure 1. It is emphasized that the upper pivoting shaft 47 and the lower pivoting shaft 44 are both parallel to each other and parallel to the direction of transportation in the area of the milling station. Through the fork 46, 48 and its upper pivoting shaft 47, the parts fitted to the lower pivoting shaft 44 become able to perform a swinging motion with respect to the upper pivoting shaft 47. In its turn the motor 42, together with the cutting miller 40, can make a balance-like motion with respect to the lower pivoting shaft 44, in order to enable the milling cutter 40, together with its motor 42, to move in a vertical plane perpendicular to the direction of transportation about both pivoting shafts 44 and 47 alone or in combination. The balance-like motion about the lower pivoting shaft 44 is controlled by a reaction arm 52 which is rotationally rigid and fixed to the lower pivoting shaft 44 with a hub 51. With the help of adjustment grooves and fixing bolts, schematically indicated with 53, the angular position of the reaction arm 52 with regard to the pivoting shaft 44 and therefore with respect to the milling cutter 40 may be adjusted. At the upper end of the reaction arm 52 there is fitted a short pin 54, facing the swing arm 46. Opposite to pin 54 and perpendicular to the swing arm 46, a crossbar 55 is fitted, which has corresponding short pins 56 and 57 fitted to both of its ends of equal distance. They are facing the pin 54. Between pin 54 and each of the pins 56 and 57 pre-stressed tension springs are connected. Thanks to the opposing spring-forces, the reaction arm 52 finds an equilibrium mid position with respect to the swing 46, 47, 48. The pivoting or swinging motion of the lower pivoting shaft 44 will therefore be influenced by both of the springs 58 and 59 and has a dampening influence during the milling operation. The swinging motion about the upper pivoting shaft 47, however, is absolutely free and is only influenced by gravity.

In order to adjust the milling cutter in the right position with respect to each fresh arriving pig-leg, the position of the cutter should each time renewedly be adjusted in said vertical plane. Therefore, the supporting means of the milling cutter is provided with feeler- or guiding means, which adjusts the position of the cutter to the geometry of the arriving leg. For that purpose, the cutter 40 is surrounded by a cover 60 which is fitted to the supporting plate 43 with the help of brackets 61. At the lower side of the cover 60, guiding rods 62 and 64 are fitted which extend parallel to the direction of transportation. At their entry-end, they have outward-bent feeler-ends 63 and 65. Their mutual distance is such that the average leg can pass between them. When pivoting about both pivoting shafts 44 and 47, the guiding means 62 and 64 thus can guide the milling cutter such that it will be positioned in the horizontal plane just between the toes, before the milling itself will start. A great variety might exist with respect to the widths of subsequent pig legs. Thus, one or both guiding means 62 and 64 could be made resilient. In FIG. 2, this is depicted exemplarily for the guiding rod 62. It is fitted on two hinge arms 66, which are connected through hinges 67 to the cover 60. With adjustable resilient guiding means 68, the hinge arms 66 is urged against the cover 60 in the position of rest. When an oversized leg arrives between the guiding means, then the guiding rod 62 can move sideways but continues its guiding and positioning function for the cutter. With dotted lines 66' and 63' in FIG. 2, the give-away position is schematically illustrated.

The adjustment of the vertical position of the cutter with respect to both toes takes place by means of a ruler 69 fitted with a feeler-entry-end 70. The ruler is adjustable in height by means of bolts through slots screwed in a plate 71 fitted to cover 60.

The prepositioning made by the guiding means 62 and 64 is taken over by the ruler, which follows with its entry-end 70 the V-shape in the toe, which results in an optimal positioning of the cutter with respect to the leg. The entry-end 70 of the ruler pushes the cutter upward as well, in order that, from the very start of the milling operation, the cutter cannot dig itself deep into the material to be milled away. The lower side of the ruler 69 will therefore be adjusted a little higher than the circumferential profile of the cutter. Since the ruler leaves contact with the toes during the milling operation, the milling cutter will cut the material away to a depth which corresponds to the average position adjusted by the springs 58 and 59.

In order to remove the cut-away material and to avoid the cutter from being clogged, a water supply 73 is fitted to the cover 60. Through a supply fitting 74, it is connected to a source of flushing water. From the distribution pipe 73, injection openings are made in the cover, two of them being schematically illustrated at 75. With the flushing water jets, the cut-away material is removed and will be concentrated in a lower gutter 76. This gutter is adjustably fitted to the cover 60 with bolts and slots. For the sake of clarity, the gutter 76 is illustrated in FIG. 2 further to the right side than would be its optimal position. The flushing water may freely leave the gutter 76 at one end into a container, in order not to influence the balanced position of the unit.

The cover 60 may partly be made of transparent material like perspex, to make visual inspection of the milling operation possible.

Although it will not be indicated more in detail, it will be evident that some of the means or apparatus according to the invention to enable the positionability of the cutter may be adjustable during erection in order to optimalize the whole installation with respect to the slaughterhouse with its often already available installations like e.g. the conveyor-rail and the coat-hook-shaped carrying-yokes.

Surprisingly, experiments have shown that normal, in-trade available, milling cutters for machining metals are extremely useful for the above described application. It is an advantage that the development, production and store-holding of special milling cutters are not necessary.

Apart from the drive for the cutter, all necessary energy for the orientation of the pig-body and of the cutter with respect to the legs to be cut is derived from the existing or anyhow necessary transport system of the slaughterhouse. Extra drives, controls, etc. are unnecessary. This keeps the whole installation therefore extremely simple, avoiding the risk of work interruptions in the humid-warm ambient conditions in the average slaughterhouse, in which high hygienic standards prevail.

What is claimed is:

1. An apparatus for the removal of a toe-web from the hindleg of a slaughtered pig, said slaughtered pig having been hung with the tendons of said hindleg on a coat-hook-shaped carrying-yoke, the latter being pivotable about a vertical axis, being hung on a horizontal conveyor, and being uniformly moved forward, said conveyor including a carrying structure and said carrying-yoke for passing along a toe-web cutting station, comprising, in combination:
   a rotatable driven-milling-cutter having a cutting wheel adapted for cutting said toe web;
   an orientation-means, fitted on the carrying structure of the conveyor, which, over a limited trajectory of the conveyor path in the area of the toe-web cutting station, orients the vertically hanging body on its carrying-yoke with respect to the direction of transportation by pivoting said vertically hanging body about the vertical rotation axis of the yoke, and maintaining a line connecting both hindlegs perpendicular to the conveyor path during the removal of the toe-web;
   supporting means for rotatingly supporting said cutting wheel while the axis of rotation of the cutting wheel is continuously maintained in a vertical plane perpendicular to the conveyor path, said supporting means being pivotable about at least one axis parallel to the direction of transportation; and
   guiding means, fitted on said supporting means, for self-orientation of said cutting wheel in relation to the hindleg of the pig.

2. An apparatus according to claim 1 characterized wherein said orientation means includes a pivotable, turned-over U-shaped orientation-yoke, which is pivotably supported with the base of its U-shape about a horizontal pivoting shaft perpendicular with respect to the conveyor path and which bears, each leg having a free end, and wherein said orientation-means includes resilient means, interconnected between said legs of said carrying-yoke and said carrying structure, for urging the orientation-yoke against the carrying-yoke, whereby the orientation-yoke passes through the milling station in one and the same orientation perpendicular to the direction of transportation.

3. An apparatus according to claim 2 wherein said pivoting shaft of the orientation-yoke is positioned at a predetermined height above the conveyor path, said predetermined height being sufficient for said free ends of said legs of said orientation-yoke to lose contact with the carrying-yoke when said carrying-yoke is near the end of the milling station, whereby the orientation-yoke returns to its rest-position under influence of a spring force urging on it.

4. An apparatus according to claim 1 wherein the pivotable supporting means of the milling cutter includes two parts mutually pivoting about parallel axes, one of said parts forming a swing-shaped support, with its upper pivoting shaft being fitted to a substantially higher position of the carrying structure of the conveyor than the axis of rotation of the milling cutter, and the other part being connected to a lower parallel pivoting shaft, said lower parallel pivoting shaft being situated below the axis of rotation of the milling cutter, said lower pivoting shaft also being carried by the swing-shaped support to swing about the upper pivoting shaft and being free to follow the guiding means and being only influenced by gravity forces, and wherein the apparatus further includes a reaction arm, fitted to the balance part, and spring means, interconnected to said reaction arm, for limiting movement of said reaction arm and said lower pivoting shaft.

5. An apparatus according to claim 1 or 2 or 3 or 4 wherein the guiding means includes two guiding rods which extend parallel to the direction of transportation and which are fitted with outwardly bent entry ends, said guiding rods extending a larger distance than the thickness of said hindleg and fitted to the balance-shaped part of the supporting means for the cutter, said cutting wheel of the milling cutter being situated in the center of the guiding rods, said guiding means further including a flat ruler with a feeler-entry-end which is fitted parallel to and between the guiding rods in the plane of the milling cutter and in such a position with respect to the milling cutter that, during the continuing transportation-motion of each hindleg, first a feeler-entry-end of the guiding rods come into contact with the hindleg and (by pivoting about the upper pivoting shaft of the swing moving mainly in a horizontal plane) permit said hindleg to pass along between them, whereafter the ruler, with its feeler-entry-end between both toes of said hindleg, directs the cutter in a mainly vertical direction in order to have the cutter mill away the material between the toes starting from and remaining in a correct position.

6. An apparatus according to claim 5 wherein at least one of the guiding rods is urged against the supporting means by a spring in order to have said guiding rods give-away for a passing hindleg.

7. An apparatus according to claim 1 or 2 or 3 or 4 wherein the milling cutter wheel is fitted with cutting teeth of a type as commonly used for machining metals.

* * * * *